United States Patent [19]

Stricklen

[11] Patent Number: 5,206,315
[45] Date of Patent: Apr. 27, 1993

[54] PROCESS FOR POLYMERIZING 1-OLEFINS AND CATALYST THEREFOR

[75] Inventor: Phil M. Stricklen, Bartlesville, Okla.

[73] Assignee: Phillips Petroleum Company, Bartlesville, Okla.

[21] Appl. No.: 335,777

[22] Filed: Apr. 10, 1989

[51] Int. Cl.$^5$ .................. C08F 4/642; C08F 10/14
[52] U.S. Cl. .................... 526/142; 502/103; 502/126; 526/140; 526/348.4
[58] Field of Search .................. 526/140, 142, 159

[56] References Cited

U.S. PATENT DOCUMENTS

| | | | |
|---|---|---|---|
| 2,957,225 | 10/1960 | Welch et al. ................ 28/82 |
| 3,058,963 | 10/1962 | Vandenberg .................. 526/159 |
| 3,718,635 | 2/1973 | Tomoshige et al. ............ 260/93.7 |
| 3,769,373 | 10/1973 | Reed et al. .................... 526/153 |
| 3,773,735 | 11/1973 | Diedrich et al. ............... 526/153 |
| 3,789,036 | 1/1974 | Longi et al. ................... 260/80.7 |
| 4,028,481 | 6/1977 | Shiomura et al. .............. 526/142 |
| 4,056,668 | 11/1977 | Berger et al. .................. 526/124 |
| 4,135,045 | 1/1979 | Matsuzawa et al. ........... 526/114 |
| 4,136,243 | 1/1979 | Appleyard et al. ............ 526/140 |
| 4,143,223 | 3/1979 | Toyota et al. ................. 526/125 |
| 4,159,256 | 6/1979 | Sakurai et al. ................ 526/127 |
| 4,210,738 | 7/1980 | Hermans et al. .............. 526/152 |
| 4,267,294 | 5/1981 | Long ............................. 526/125 |
| 4,357,452 | 11/1982 | Kakogawa et al. ............ 526/139 |
| 4,471,066 | 9/1984 | Sakurai et al. ................ 502/113 |
| 4,659,792 | 4/1987 | Kashiwa et al. ............... 526/73 |
| 4,701,506 | 10/1987 | Agapiou et al. ............... 526/128 |

FOREIGN PATENT DOCUMENTS 1314258 4/1973 United Kingdom .

*Primary Examiner*—Edward J. Smith
*Attorney, Agent, or Firm*—Laney, Dougherty, Hessin & Beavers

[57] ABSTRACT

A process for preparing polymers of 1-olefins and a catalyst for such process are provided. The catalyst is comprised of a solid titanium halide-containing compound and an alkylaluminum hydride.

10 Claims, No Drawings

PROCESS FOR POLYMERIZING 1-OLEFINS AND CATALYST THEREFOR

BACKGROUND OF THE INVENTION

1. Field Of The Invention

The present invention relates to an improved process for polymerizing 1-olefins and a titanium-containing catalyst therefor.

2. Description of the Prior Art 1-olefins have heretofore been polymerized in contact with catalyst systems comprised of titanium-containing compositions and cocatalysts or activators comprised of organic metallic halides and/or other compounds.

A variety of solid titanium halide-containing compounds have been developed and used heretofore for polymerizing and copolymerizing olefins. For example, U.S. Pat. No. 3,718,635 to Tomoshige et al. describes a pulverulent titanium catalyst obtained by copulverizing a low valency titanium halide compound and an organoaluminum compound. U.S. Pat. No. 4,028,481 to Shiomura et al. discloses a catalyst obtained by copulverizing a low valency titanium halide with an organic compound containing oxygen, sulfur or phosphorus. U.S. Pat. No. 4,659,792 to Kashiwa et al. discloses a titanium catalyst component prepared by reacting magnesium chloride, a titanium halide and a diester such as a diester of a dicarboxylic acid.

A titanium halide-containing compound which is particularly effective as a catalyst for polymerizing olefins is comprised of a $TiCl_3$ complex prepared by reducing $TiCl_4$ with an aluminum halide, treating the reduced solid with a complexing agent and then bringing the complexing agent treated solid into contact with additional $TiCl_4$. A second catalyst component, i.e., an organic aluminum halide, which functions as an activator is utilized with the $TiCl_3$ complex. Such a catalyst and its use in polymerizing 1-olefins is described in U.S. Pat. No. 4,210,738 to Hermans et al.

By the present invention, an improved process and two-component catalyst for polymerizing 1-olefins are provided which result in improved catalyst productivity and polymer properties.

SUMMARY OF THE INVENTION

The present invention relates to a process for preparing polymers of 1-olefins which utilizes a two-component catalyst. The first catalyst component is comprised of a solid titanium halide-containing compound of the type heretofore utilized. A preferred such compound is a solid titanium trichloride complex having the formula $$TiCl_3(AlR_nX_{3-n})_x(C)_y$$

wherein

R is a hydrocarbon radical containing from 1 to 18 carbon atoms,

X is a halogen, n is a number from 0 to 2,

C is an organic complexing agent selected from compounds having the formulae $$R'\text{-}O\text{-}R'',\ R'\text{-}S\text{-}R''\ \text{and}\ R'\text{-}SH$$

wherein R' and R" are independently hydrocarbon radicals containing from 1 to 15 carbon atoms, x is a number less than 0.3, and y is a number higher than 0.001.

The second catalyst component which functions as an activator is an alkylaluminum hydride of the formula $$AlR'''_m H_{3-m}$$

wherein

R''' is a hydrocarbon radical containing from 1 to 18 carbon atoms, and m is a number from 1 to 2.

A particularly preferred catalyst is comprised of the above-described solid titanium trichloride complex and a second catalyst component comprised of diethylaluminum hydride present in a molar ratio, respectively, of about 1:3.

A preferred process of the present invention comprises polymerizing 4-methyl-1-pentene in contact with a two-component catalyst comprising the solid titanium trichloride complex described above and diethylaluminum hydride wherein the 4-methyl-1-pentene monomers and the two component catalyst are present in a weight ratio, respectively, of about 2000:1.

It is, therefore, a general object of the present invention to provide an improved process and catalyst for polymerizing 1-olefins.

Another object of this invention is to provide a process and catalyst for polymerizing 1-olefins wherein improved catalyst productivity and polymer properties are obtained.

Other objects, features and advantages of the present invention will be readily apparent to those skilled in the art upon a reading of the description of preferred embodiments which follows.

DESCRIPTION OF PREFERRED EMBODIMENTS

The process of the present invention for preparing polymers of 1-olefins comprises polymerizing the 1-olefins in contact with a two-component catalyst system which includes a solid titanium halide-containing compound and an alkylaluminum hydride activator.

The first catalyst component can be any of the various high activity titanium halide-containing compounds which have been utilized as catalysts or catalyst components heretofore, i.e., a magnesium chloride supported titanium trichloride compound, a titanium trichloride organic complex and others. A preferred first catalyst component is a solid titanium trichloride organic complex represented by the formula $$TiCl_3(AlR_nX_{3-n})_x(C)_y$$

wherein

R is a hydrocarbon radical containing from 1 to 18 carbon atoms,

X is a halogen, n is a number from 0 to 2,

C is an organic complexing agent selected from compounds having the formulae $$R'\text{-}O\text{-}R'',\ R'\text{-}S\text{-}R''\ \text{and}\ R'\text{-}SH$$

wherein R' and R" are independently hydrocarbon radicals containing from 1 to 15 carbon atoms, x is a number less than 0.3, and y is a number higher than 0.001.

The most preferred solid titanium trichloride complex for use in accordance with the present invention is of the formula set forth above wherein
R is a hydrocarbon radical containing from 2 to 6 carbon atoms,
X is chlorine,
n is 2,
C is an organic complexing agent having the formula

R'-O-R"

wherein
R' and R" are identical alkyl radicals containing from 4 to 6 carbon atoms,
x is a number less than 0.2, and
y is a number exceeding 0.009.

The above-described solid titanium trichloride complex as well as its method of preparation are described in U.S. Pat. No. 4,210,738 issued to Hermans et al. on Jul. 1, 1980, which patent is incorporated herein by reference thereto. Generally, the titanium trichloride complex is prepared by reducing $TiCl_4$ with an aluminum halide under conditions which cause the precipitation of a solid $TiCl_3$ product. The most favorable results are obtained when the reduction reaction is carried out at a temperature of about 0° C. in an inert diluent such as hexane. The temperature of the reaction mixture is then progressively raised, preferably to a temperature between 40° C. and 100° C. under continuous moderate agitation. After maintaining such temperature for a period of time, the precipitated solid formed is separated and washed.

The aluminum halide reducing agent is of the general formula $$AlR_nX_{3-n}$$

wherein
R is a hydrocarbon radical containing from 1 to 18, most preferably from 2 to 6, carbon atoms,
X is a halogen, preferably chlorine, and
n is a number from 0 to 2, preferably 2.

The solid prepared as described above by reacting $TiCl_4$ with an aluminum halide of the type described above is next treated with an organic complexing agent selected from compounds having the formulae R'-O-R", R'-S-R" and R'-SH wherein R' and R" are independently hydrocarbon radicals containing from 1 to 15 carbon atoms, preferably from 2 to 8 carbon atoms. Examples of suitable such compounds are diethyl ethers, dipropyl ethers, dibutyl ethers, diethyl thioethers, dibutyl thioethers, and ethyl mercaptans. The most preferred organic complexing agent has the formula R'-O-R" wherein R' and R" are independently hydrocarbon radicals containing from 2 to 8 carbon atoms.

The treatment of the reduced solid titanium chloride product by means of the complexing agent can be effected with the reduced solid suspended in a diluent such as hexane. The complexing agent is combined with the reduced solid in the diluent in an amount between from about 0.1 to about 2.5 moles of $TiCl_3$ present in the reduced solid at a temperature between 0° C. and 80° C. and for a time in excess of 5 minutes.

The complexing agent treated reduced solid is brought into contact with additional $TiCl_4$ in a final step, preferably in the presence of a diluent such as hexane. The reaction of the treated solid with the $TiCl_4$ is preferably carried out at a temperature between 60° C. and 70° C. for a time between 1 and 3 hours with agitation. The resulting solid catalytic complex is separated from the reaction medium in a conventional manner.

The second catalyst component or activator utilized in accordance with the present invention is an alkylaluminum hydride of the formula $$AlR'''_mH_{3-m}$$

wherein
R''' is a hydrocarbon radical containing from 1 to 18 carbon atoms, preferably from 2 to 6 carbon atoms and most preferably 2 carbon atoms, and
m is a number from 1 to 2, preferably 2.

Examples of suitable such alkylaluminum hydrides are dimethylaluminum hydride, ethylaluminum dihydride and dicyclohexylaluminum hydride, with diethylaluminum hydride being the most preferred.

The molar ratio of the first catalyst component of the two-component catalyst (the titanium halide-containing compound) to the second catalyst component (the alkylaluminum hydride) is generally in the range of about 1:0.5 to about 1:10. Most preferably, the molar ratio of titanium halide-containing compound to alkylaluminum hydride is about 1:3.

The two-component catalyst, i.e., the solid titanium halide-containing compound and the alkylaluminum hydride, can be used for the polymerization and copolymerization of terminally unsaturated linear aliphatic olefins, both branched and unbranched, which contain from 2 to 18, preferably 2 to 6, carbon atoms. The branched olefins can have methyl, ethyl or vinylcyclohexane branches at the 3, 4 or 5 carbon locations. The alpha olefins can also be copolymerized with diolefins containing 4 to 18 carbon atoms using the two-component catalyst. Examples of alpha olefin monomers are ethylene, propylene, 1-butene, 1-pentene, and 4-methyl-1-pentene. Examples of diolefin monomers are non-conjugated aliphatic diolefins such as 1,4 hexadiene; non-conjugated monocyclic diolefins, such as 4-vinylcyclohexene; alicyclic diolefins having an endocyclic bridge, such as dicyclopentadiene, methylene and ethylidene norbornene; and conjugated diolefins such as butadiene mr isoprene. The terms "polymerizing" and "polymers" as used herein are intended to be inclusive of copolymerizing and copolymers, respectively.

In carrying out the process of the present invention utilizing the above-described two-component catalyst, the monomers to be polymerized can be dissolved or suspended in a hydrocarbon solvent or diluent which is preferably an aliphatic or cycloaliphatic hydrocarbon, e.g., butane, pentane, hexane, heptane, cyclohexane, methylcyclohexane, or mixtures thereof. Alternatively, the polymerization can be carried out in the monomers without a diluent when the monomers can be kept in the liquid state. The two components of the catalyst, i.e., the solid titanium halide-containing compound and the alkylaluminum hydride, can be separately added to the polymerization medium containing the monomers or they can be mixed and heated for a period of time prior to being introduced into the polymerization medium. The polymerization is carried out at a temperature generally between about 20° C. and 200° C. and at a pressure generally between atmospheric pressure and about 50 atmospheres. The weight ratio of the 1-olefin monomers to the two-component catalyst used (the titanium halide-containing compound plus the alkylaluminum hydride) is generally in the range of from about 10:1 to higher melt flow means a lower molecular weight polymer is produced.

The results of these tests are given in Table I below.

TABLE I

| Polymerization No. | Quantity of TiCl₃ Complex Catalyst,[1] grams | Second Catalyst Component Used | Quantity of Second Catalyst Component, grams | Polymerization Temperature | Productivity, Grams of Polymer Produced per Gram of Catalyst Used | Melt Flow |
|---|---|---|---|---|---|---|
| 1 | 0.1046 | diethylaluminum hydride | 0.23 | 70° C. | 1600 | 1.02 |
| 2 (comparative) | 0.1817 | diethylaluminum chloride | 0.37 | 70° C. | 682 | 0 |
| 3[2] | 0.1384 | diethylaluminum hydride | 0.184 | 50° C. | 3666 | 2.67 |
| 4 | 0.0451 | diethylaluminum hydride | 0.184 | 50° C. | 1215 | 3.79 |
| 5 | 0.0860 | diethylaluminum hydride | 0.23 | 50° C. | 1842 | 2.14 |
| 6 | 0.0753 | diethylaluminum hydride | 0.23 | 50° C. | 1873 | 2.99 |
| 7 (comparative) | 0.1597 | diethylaluminum chloride | 0.56 | 50° C. | 559 | 0 |

[1] Solvay 01 solid TiCl₃ Complex
[2] Reacted for 21 minutes instead of one hour.

about 10,000:1, preferably about 3000:1.

In order to further illustrate the process and catalyst of the present invention, the following example is given.

EXAMPLE

Polymerizations of 4-methyl-1-pentene were conducted using a catalyst of the present invention, i.e., a solid titanium trichloride complex and diethylaluminum hydride. The solid titanium chloride complex used was a commercially available such complex of the type described in U.S. Pat. No. 4,210,738 sold by the Solvay & Cie Company of Brussels, Belgium under the trade designation Solvay 01 catalyst. Comparative polymerizations were also conducted utilizing the Solvay 01 catalyst and diethylaluminum chloride.

The polymerizations were conducted in a 1-liter autoclave reactor at 50° C. and 70° C. In each polymerization, 300 grams of 4-methyl-1-pentene were added to the reactor as the source of monomer for the polymerization and also as the polymerization medium. The quantities of Solvay 01 catalyst and diethylaluminum hydride or diethylaluminum chloride given in Table I below were added to the reactor, and each reaction mixture was heated to a temperature of 50° C. or 70° C. and reacted for one hour. The productivity of poly(4-methyl-1-pentene) for each polymerization was determined as was the melt flow of each polymerized product.

The "melt flow" test utilized is described in ASTM Test Procedure D1238 52T, Procedure A. A 4-gram sample of the polymer tested is placed in a ⅜ inch diameter tube at 260° C., and a load of 5,000 grams is applied to a plunger which forces the melted polymer through a die having a diameter of 0.0825 inch. The melt flow of the polymer sample is the rate, in decigrams per minute, at which the polymer is extruded through the die. A From Table I it can be seen that the polymerization process and two-component catalyst of the present invention result in higher productivity and polymers having higher melt flow as compared to a similar process utilizing diethylaluminum chloride as the second catalyst component.

What is claimed is:

1. A process for preparing a polymer of 1-olefin monomer comprising polymerizing said monomer in contact with a two-component catalyst, the first component being comprised of a solid titanium trichloride complex having the formula $$TiCl_3(AlR_nX_{3-n})_x(C)_y$$

wherein
R is a hydrocarbon radical containing from 1 to 18 carbon atoms,
X is a halogen,
n is a number from 0 to 2,
C is an organic complexing agent selected from compounds having the formula $$R'-O-R'', R'-S-R'' \text{ and } R'-SH$$

wherein R' and R'' are independently hydrocarbon radicals containing from 1 to 15 carbon atoms,
x is a number less than 0.3, and
y is a number higher than 0.001, and the second component being comprised of an alkylaluminum hydride of the formula $$AlR'''_mH_{3-m}$$

wherein

R''' is a hydrocarbon radical containing from 1 to 18 carbon atoms, and m is a number from 1 to 2.

2. The process of claim 1 wherein said first and second catalyst components are present in a molar ratio, respectively, in the range of from about 1:0.5 to about 1:10.

3. The process of claim 2 wherein said 1-olefin monomer and said two-component catalyst are present in a weight ratio, respectively, in the range of from about 10:1 to about 10,000:1.

4. The process of claim 1 wherein said complexing agent has the formula

R'-O-R'' wherein R' and R'' are independently hydrocarbon radicals containing from 2 to 8 carbon atoms.

5. The process of claim 4 wherein R''' is ethyl and m is 2.

6. The process of claim 5 wherein said first and second components are present in a molar ratio, respectively, of about 1:3.

7. The process of claim 6 wherein said 1-olefin monomer is 4-methyl-1-pentene monomer, and said monomer and said two-component catalyst are present in a weight ratio, respectively, of about 3000:1.

8. A process for polymerizing 4-methyl-1-pentene monomer comprising polymerizing said monomer in contact with a two-component catalyst, the first catalyst component being comprised of a solid titanium trichloride complex having the formula $TiCl_3(AlR_nX_{3-n})_x(C)_x$ wherein R is a hydrocarbon radical containing from 2 to 6 carbon atoms, X is chlorine, n is 2, C is an organic complexing agent having the formula

R'-O-R'' wherein

R' and R'' are identical alkyl radicals containing from 2 to 8 carbon atoms, x is a number less than 0.2, and y is a number exceeding 0.009; and the second catalyst component being diethylaluminum hydride.

9. The process of claim 8 wherein said first and second catalyst components are present in a molar ratio, respectively, of about 1:3.

10. The process of claim 9 wherein said 4-methyl-1-pentene monomer and said two-component catalyst are present in a weight ratio, respectively, of about 3000:1.

* * * * *

UNITED STATES PATENT AND TRADEMARK OFFICE
CERTIFICATE OF CORRECTION

PATENT NO. : 5,206,315
DATED : April 27, 1993
INVENTOR(S) : Phil M. Stricklen It is certified that error appears in the above-identified patent and that said Letters Patent is hereby corrected as shown below:

Col. 8, claim 8, line 8, change "$TiCl_3(AlR_nX_{3-n})_x(C)_x$" to

--$TiCl_3(AlR_nX_{3-n})_x(C)_y$--.

Signed and Sealed this

Twenty-first Day of February, 1995

Attest:

BRUCE LEHMAN

*Attesting Officer*    *Commissioner of Patents and Trademarks*